(No Model.)
G. H. POND.
BUOYANT PROPELLER.
No. 424,077. Patented Mar. 25, 1890.
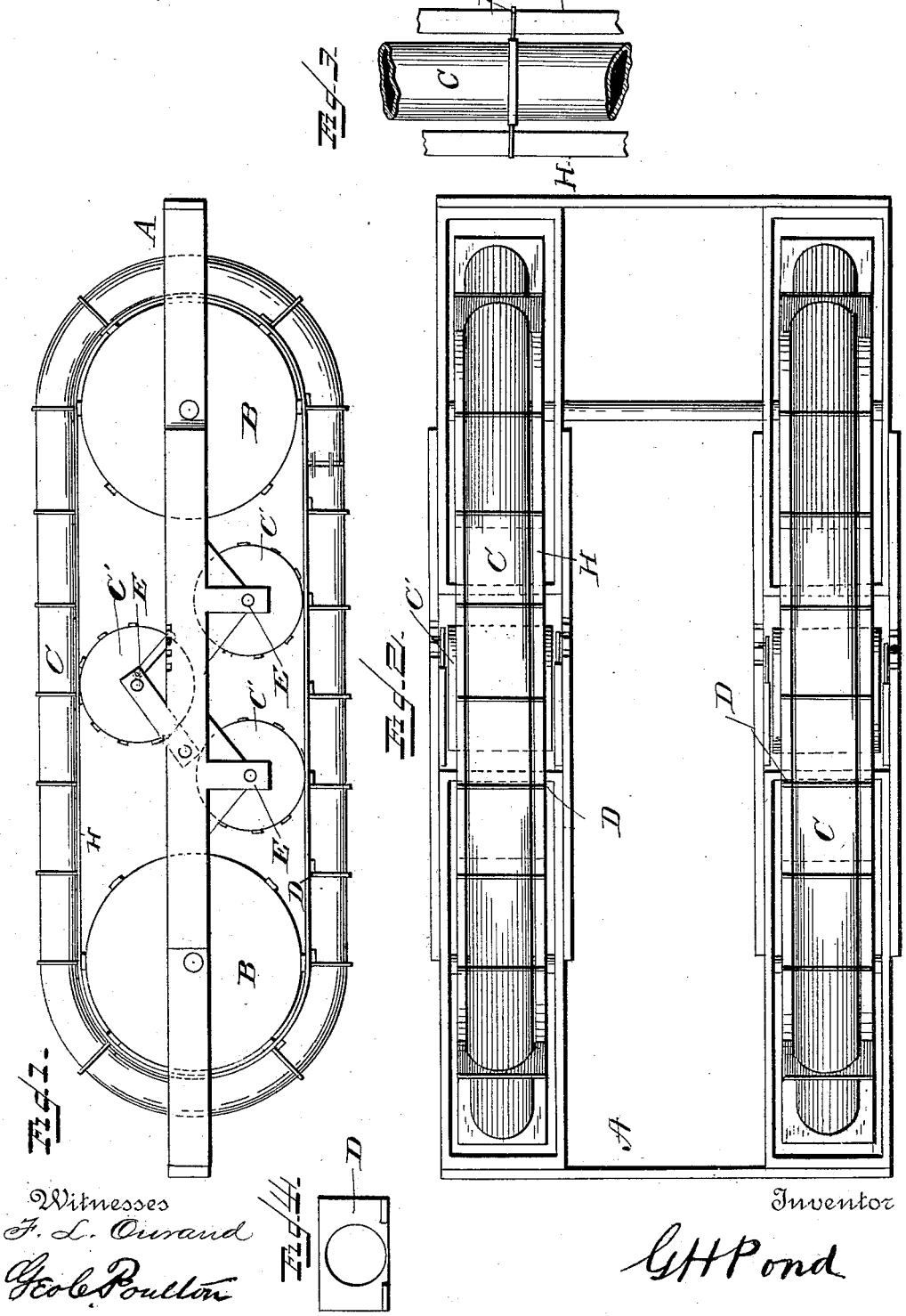
Witnesses
F. L. Ourand
Geo. C. Poulton
Inventor
G H Pond

UNITED STATES PATENT OFFICE.

GOLDSBURY HARDEN POND, OF GLENS FALLS, NEW YORK.

BUOYANT PROPELLER.

SPECIFICATION forming part of Letters Patent No. 424,077, dated March 25, 1890.

Application filed July 28, 1887. Serial No. 245,526. (No model.)

*To all whom it may concern:*

Be it known that I, GOLDSBURY HARDEN POND, a citizen of the United States, residing at Glens Falls, in the county of Warren and State of New York, have invented certain new and useful Improvements in Water-Locomotives; and I do hereby declare the following to be a full, clear, and exact description of the invention, such as will enable others skilled in the art to which it appertains to make and use the same.

This invention relates to certain improvements in water-craft for locomotion on and over the surface of water; and it has for its objects to provide a water-craft with a flexible buoyant endless track which will float the craft upon the surface of the water, and which will roll forward and back without resistance of the water to the craft when in motion. These objects I attain by the means illustrated in the accompanying drawings, in which—

Figure 1 represents a side elevation of my improved craft. Fig. 2 represents a plan view of the same, and Figs. 3 and 4 represent detail detached portions of the running-gear of the craft.

Referring to the drawings, the letter A indicates a frame of wood-work or other buoyant material, near the ends of which are journaled the shafts of two drums or wheels B, which have sprocket projections on their peripheries. The said frame is adapted to float on the surface of the water, with the lower portions of the tubes C submerged. The said tubes C consist of an endless conduit of rubber or other light water-proof material, made in sections, which extends over the two drums or wheels before mentioned. Between the said wheels B in the frame A are located the wheels C', which are journaled in bearings at each side of the frame. These wheels have on their peripheries a series of slats, (sprockets,) which take into the yielding surface of the continuous tubes and move in the proper direction. The rubber (or other) tube C is provided at intervals on its outside with propelling and holding buckets D, which operate to propel the craft forward when the said tubes are in motion. These buckets or compartments are secured to belts H on each side of each tube, which latter are secured in openings in the cross-boards that support them and the belts and keep the parts in proper relative position. The cross-boards act, when in the water, in the nature of friction devices to prevent motion of those parts of the tubes which are submerged, as far as practicable, until such time as they are lifted from the water.

The wheels C', above mentioned, have their shafts adjusted in movable bearings E, whereby they may be spread apart relatively, so as to distend the rubber endless belt and keep it taut, as occasion requires.

The flexible endless buoys C can be made of any buoyant water-proof material. Cork in canvas bags, or "lamp-black" (carbon) in bags, forms a good substitute for the air-tubes C. The flexible endless buoys C, forming the track for the wheels to roll upon, are held in place upon the wheels by the belts H H and the buckets D D, through which they pass. The belts run between the flexible buoys and the wheels B B, and are kept upon them by flanges or any other means common to mechanics. They are prevented from spreading apart by the buckets D D, to which they are fastened. The buckets D D also serve to hold the flexible endless buoy-track from slipping through the water. In order to make headway, the track must remain stationary when once laid down at the forward end, as it comes over the wheels, until it is wound up by the stern-wheels, just the same as if it was upon the land, and the buckets D D must be large and numerous enough to hold it and prevent any slip through the water, so as to roll and move over the surface of it just the same as it would move over the surface of the ground.

When properly loaded, the flexible endless buoy-track does not sink into the water below the center of the buoys. In place of the belts any kind of rope can be used. It can be propelled by either man, steam, electricity, or sail. The motive power can be attached to either or both of the axes in the usual manner and with a mast located in the usual position. When sails are to be used, it can have all the "breadth of beam" required for very large sails by extending the ends of the frame to the required width.

The flexible buoys made of very light air-tubes rise from the water with considerable force as the stern-wheels roll them up—enough so to equal the displacement at the forward end as the wheels there roll them down into the water, so that the displacement at the forward end by the buoys, as they roll down into the water, is exactly balanced by the replacement as they come out of the water onto the stern-wheels. The only resistance to the propelling-power being the friction of the machinery, the resistance of the water to the motion does not increase as the speed increases. It is always the same and always equally balanced by the force the buoys exert in rising from the water at the stern.

Having thus described my invention, what I claim, and desire to secure by Letters Patent, is—

1. In a water-locomotive, the combination of the frame, the rotating drums or wheels journaled therein, the endless tube passing around said drums, and the cross-boards or buckets attached to said tube, substantially as described.

2. In a water-locomotive, the combination of the frame, the rotating drums or wheels journaled therein, and the belts or cables connected by the cross-boards and passing around said drums, one on each side of an endless tube, and the endless tube passing around said drums, substantially as described.

3. In a water-locomotive, the combination of the frame, the rotating drums or wheels journaled therein, the belts or cables connected by the cross-boards attached to an endless tube, and a device normally bearing upon both tube and bands and made movable toward them to maintain or increase their tension, substantially as described.

4. The combination of the frame, the drums or wheels journaled in said frame, the non-collapsible endless air-tight tube passing around said drums, provided with cross-boards having each an aperture to receive the tube, and the belts, one on each side of each tube and secured to the supporting cross-boards, substantially as described.

In testimony whereof I affix my signature in presence of two witnesses.

GOLDSBURY HARDEN POND.

Witnesses:
GEO. C. POULTON,
JAS. F. COLEMAN.